April 14, 1959 W. W. RODGERS 2,881,458
LOADING DOCK RAMP
Filed Aug. 11, 1953 2 Sheets-Sheet 1
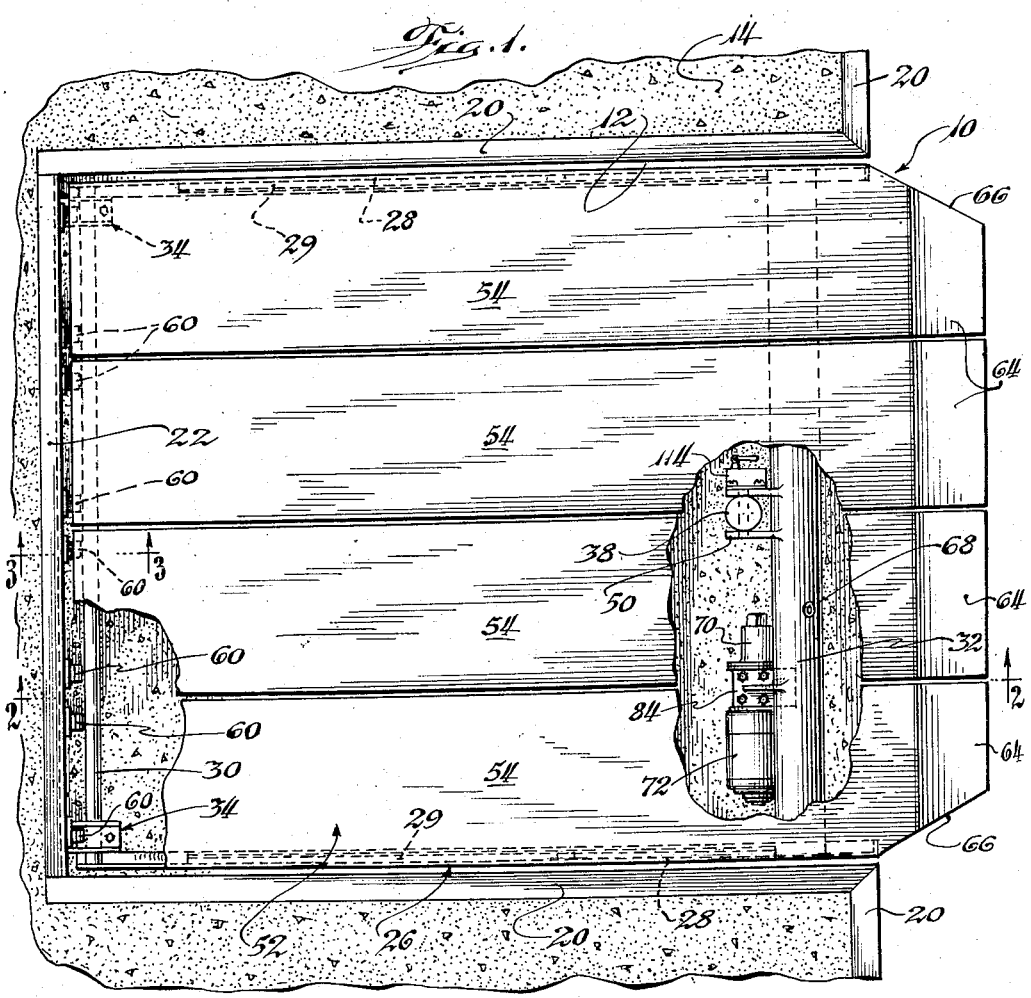
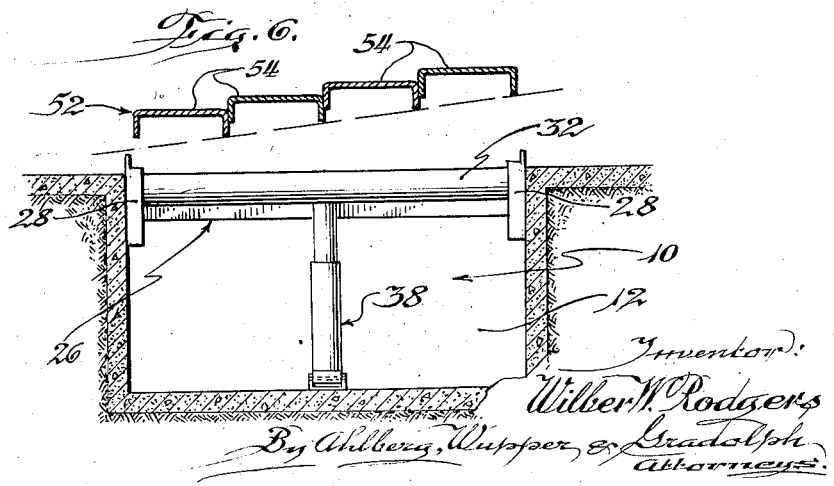

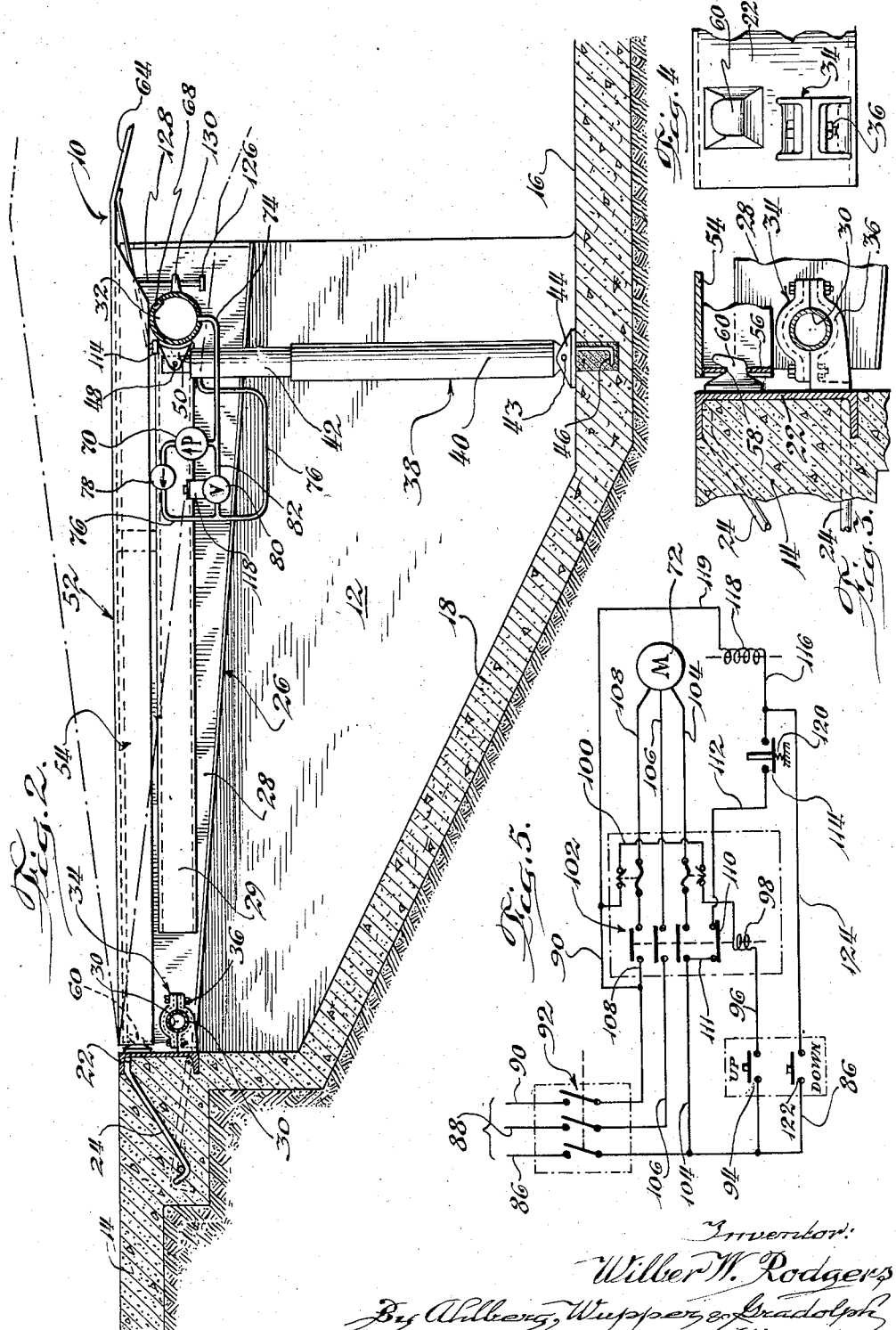

United States Patent Office

2,881,458
Patented Apr. 14, 1959

2,881,458

LOADING DOCK RAMP

Wilber W. Rodgers, Memphis, Tenn., assignor to Dover Corporation, a corporation of Delaware Application August 11, 1953, Serial No. 373,614

2 Claims. (Cl. 14—71)

The present invention relates to improvements in loading dock ramps which are adapted to bridge between a fixed dock or platform and the bed of a freight carrier such as a truck, trailer, or the like.

Loading docks are intended to facilitate the use of wheeled and motorized material handling equipment in loading and unloading trucks and trailers parked adjacent a dock which is approximately the same height above the ground as the bed of the truck or trailer. It is known that the heights of truck beds vary by as much as a foot or more, and it is difficult to obtain access to a truck with a wheeled vehicle, particularly of the manually manipulated type, unless a relatively long dock board having a gentle slope spans the break in level between the truck bed and the stationary dock. Permanently installed dock boards or dock lifts have been used to meet this need. Such dock lifts have one end mounted to the stationary portion of the dock and the outer end supported directly by some adjustable means, preferably a hydraulic jack, so that the outer end may be raised or lowered as the conditions require.

While such dock lifts have been fairly successful in meeting the need, they possess the disadvantage that deflection of the springs as the truck is loaded and unloaded causes the truck bed supporting the outer end of the dock board to rise and descend as much as several inches, so that the dock lift will either be raised from the hydraulic jack or be supported by the hydraulic jack substantially out of contact with the truck bed. Furthermore, some trucks may have springs which are weaker or broken on one side, and the truck bed will have a transverse tilt. This tilt is also present when a very heavy load is moved onto or from one side of the truck. This load may be temporary, such as the weight of a mechanized vehicle used in loading the truck, but nonetheless it is sufficient to cause at least one side of the truck bed to come out of contact with the outer end of the loading dock, thereby presenting an abrupt rise to the dock of several inches which is difficult to manipulate.

When the loading dock ramp of the present invention is in use, its outer end will be supported on the rear of the truck bed and will rise and fall with the truck as it is loaded and unloaded, and will remain in contact with the truck bed even though the latter tilts transversely, thereby constantly providing a smooth path for the material handling vehicle or dolly.

It is, therefore, a principal object of the present invention to provide a new and improved loading dock ramp which provides for automatic compensation for truck spring deflection and out-of-level truck beds.

Another object is to provide a new and improved loading dock ramp which is easily positioned to any height truck or trailer bed.

A further object is to provide a new and improved loading dock ramp which, when in use, is supported entirely by the stationary dock and the truck bed.

Another object is to provide a new and improved loading dock ramp possessing the foregoing advantages whereinin a minimum incline is always automatically maintained.

A further object is to provide a new and improved loading dock ramp which, when moved to a position flush with the stationary dock, becomes a part of the stationary loading platform and safely carries all traffic moving in a transverse direction.

A further object is to provide a new and improved loading dock ramp having a frame incorporating a torque tube or a torsion resisting tubular member which also serves as the oil reservoir for the hydraulic operating fluid.

A further object is to provide a new and improved loading dock ramp incorporating means for limiting the free fall of the dock ramp to a very short distance in the event that the truck should be driven out from under the outer end of the dock ramp.

Other objects and advantages will become apparent from the following description taken in conjunction with the accompanying drawings, wherein:

Fig. 1 is a plan view of the loading dock ramp of the present invention, partially broken away to illustrate certain parts located below the ramp surface;

Fig. 2 is a vertical longitudinal sectional view and may be considered as taken substantially along the line 2—2 of Fig. 1, looking in the direction of the arrows, and includes a diagrammatic illustration of the hydraulic operating circuit;

Fig. 3 is an enlarged cross sectional view illustrating the pivotal connections to the stationary support, and may be considered as being taken along the line 3—3 of Fig. 1, looking in the direction of the arrows;

Fig. 4 is a fragmentary elevational view of the stationary support on the same scale as Fig. 3 illustrating the hinge members;

Fig. 5 is a schematic wiring diagram of the electrical portion of the controls for the loading dock ramp of this invention; and Fig. 6 is a small schematic view looking at the loading dock ramp from its outer end and illustrating the manner in which the individual deck sections arrange themselves to compensate for the transverse tilt of a truck bed.

The loading dock ramp constituting the present invention is indicated in its entirety by the reference character 10 and preferably is mounted within a pit or recess 12 in a stationary dock 14. As shown most clearly in Fig. 2, the pit 12 is deepest at its outer end, that is, the end adjacent the pavement or roadway 16, and has a sloping base 18 which minimizes the amount of excavation required. The upper corners of the dock structure 14 at its outer face and at the sides of the pit are protected by angles 20 in the conventional manner and, at the rear or inner end of the pit, there is a structural channel 22 secured in place by conventional reinforcing 24.

The dock ramp 10 includes a generally rectangular frame 26 comprising a pair of side members 28 which are deeper at their outer ends than at their inner ends so that when the frame 26 is pivoted upwardly the lower edges of the side members will not be lifted above the top of the platform 14. The side members 28 are stiffened by channels 29 having their legs welded to the inner faces of the members 28. The side members are interconnected at their inner ends by a tubular member 30 welded to the inner faces of the side members and adjacent their outer ends by a torque tube or torsion resisting member 32 similarly welded to the inner faces of the side members 28. The frame 26 is pivotally mounted to the fixed support or channel 22 by a pair of pillow block bearings 34 pivotally supporting the tubular member 30. Lower part 36 of each pillow block bearing is welded to the outer face of the channel 22 adjacent the lower edge thereof, as seen most clearly in Figs. 3 and 4.

Adjacent its outer edge, the frame 26 is adjustably supported by a jack 38 having a cylinder 40 and a hollow plunger 42 reciprocable therein. The cylinder 40 is pivotally mounted by a pin 43 on a base 44 secured to the pavement or bottom of the pit 12 by a suitable anchoring means 46. The plunger 42 projects upwardly from the cylinder 40 and is connected by a pivot pin 48 to a bracket 50 welded to the tube tank 32. As the piston plunger 42 is moved in and out of the cylinder 40, the frame 26 is lowered and raised.

Ramp 52 for the loading dock ramp 10 comprises a plurality of channel shaped deck sections or leaves 54 with their open sides facing downwardly. Each deck section 54 has its inner end closed by a plate 56 having slots 58 formed therein to receive hinge members 50 welded to the outer face of the channel 22. The particular structure is more fully disclosed and claimed in the copending application of Lawrence F. Jaseph, Serial No. 342,606, filed March 16, 1953 (and now abandoned), for an invention entitled "Adjustable Loading Dock" and assigned to the assignee of this invention. Each deck section is supported on a pair of the hinge members 60 to inhibit transverse tilting thereof at their inner ends, and the hinge members 60 and 34 are constructed in such manner as to prevent the deck sections 54 and frame 26 from being pulled therefrom.

The channel shaped deck sections 54 are formed with downwardly extending legs 62 which adjacent their outer ends are adapted to rest on top of the torque tube 32. Also at their outer ends the deck sections 64 are provided with outwardly projecting tips 64 which are formed without flanges and are bent slightly downwardly. These tips 64 are adapted to enter the truck body and to rest upon the truck bed, and it will be readily appreciated that they facilitate the making of a smooth path to the truck bed. It will be noted from Fig. 1 that the two side deck sections 54 have their tips 64 cut inwardly at 66 to facilitate the positioning of the truck with respect to the loading dock ramp 10.

As previously noted, hydraulic fluid or liquid for the jack 38 is stored in the torsion tube tank 32 which is provided with a normally plugged oil filling hole 68. Fluid is supplied under pressure to the jack 38 by a pump 70 driven by an electric motor 72, the inlet to the pump 70 being connected by a conduit 74 to a port in the lower side of the tank 32. The outlet from the pump 70 is connected by conduit 76 containing a check valve 78 to a suitable fitting or connection at the upper end of the hollow jack plunger 42. When it is desired to raise the outer end of the deck 52, the pump 70 is operated to supply fluid from the tank 32 through the conduits 74 and 76 and check valve 78 to the jack 38. When it is desired to lower the outer end of the deck, a solenoid controlled valve 80 in a conduit 82, connecting the conduit 76 with the conduit 74 at the inlet to the pump, is opened. The weight of the dock will move the plunger 42 inwardly of the cylinder 40 expelling fluid through the conduit 76, valve 80, and conduit 74 to the tank 32, the check valve 78 preventing reverse flow of liquid to or through the pump 70. It will be observed that these hydraulic controls are extremely simple and, while they have been diagrammatically illustrated in Fig. 2, this illustration is intended to indicate, as is the case, that the pump 70, motor 72, valves 78 and 80, and the necessary pipes and conduits, are carried on a bracket 84 which mounts them on the tank tube 32.

The electric controls for the motor 72 and the solenoid controlled valve 80 are diagrammatically illustrated in Fig. 4. Current is supplied from a three-phase line 86, 88, 90, through a manually actuated gang switch 92. Line 86 is connected to one pole of a manually operated "up" switch 94, the other pole of which is connected to a conductor 96 leading to a solenoid 98. The other pole of the solenoid 98 is connected by a conductor 100 to the line 90. Energization of the solenoid 98 closes a gang switch 102 in the conductors 104, 106 and 108 which are connected, respectively, to the lines 86, 88 and 90, and lead to the terminals of the three-phase pump motor 72. Energization of the solenoid 98 also opens a switch 110 which has one terminal connected to the line 86 through conductors 111 and 104, and the opposite terminal connected by a conductor 112 to one pole of a safety switch 114, the other terminal of which is connected to a conductor 116 leading to a solenoid 118 for the solenoid controlled valve 80. The other side of the solenoid 118 is connected by conductor 119 to the line 90. The switch 114 is biased to closed position by means such as spring 120 but is held in open position when either of the center leaves 54 is in engagement with the tube 32, the operating member for the switch 114 being mounted on the bracket 50 and below the legs 62 of the center deck sections 54.

The electric control circuit also includes a manually operable "down" switch 122 having one pole connected to the line 86 and the other pole connected to a conductor 124 leading to the conductor 116 and solenoid 118, so that closing the switch 122 energizes the solenoid 118 to open the valve 80.

While the multiple contact switch 102 and the switch 110 are shown to be solenoid operated, it will be obvious that a manually operable drum switch which includes all of the switches 94, 102, 110 and 122 could be used. While the source of electric power and the motor are illustrated as being three-phase, it is obvious that any suitable type of electric current and motor 72 may be used.

The normal or nonloading position for the dock ramp 10 is shown in Figs. 1 and 2, and the upper surface of the deck or ramp 52 is coplanar or flush with the top of the stationary dock 14. Before a truck is backed into loading or unloading position, the operator closes the "up" switch 94. A circuit through the solenoid 98 is energized, the multiple contact switch 102 is closed, and the switch 110 is opened. Closing the switch 102 completes a circuit to the motor 72. Opening the switch 110 opens a circuit to the switch 114 and the solenoid 118 so that the valve 80 remains closed. The pump 70 is, therefore, operated to pump fluid under pressure from the tank 32 through the check valve 78 and conduit 76 to the jack 38 moving the plunger 42 outwardly from the cylinder 40. The raising movement of the outer end of the dock is continued until the latter is high enough to allow the truck bed to be positioned thereunder. The operator then releases the switch 94 to deenergize the motor 72. The dock will remain in elevated position because the check valve 78 prevents reverse flow of fluid through the pump 70, and the valve 80 remains closed because the switch 114 is held in open position by the center deck sections 54 pressing thereagainst as they rest on top of the torque tube 32. The switch 110 is closed to condition the safety control for subsequent operation, should it be necessary.

When the truck has been backed into position, the operator will close the "down" switch 122 to energize the circuit through the solenoid 118, thereby opening the valve 80. Fluid will then flow from the jack cylinder 40 through the conduit 76, valve 80, and conduits 82 and 74 to the tank 32. The outer ends of the deck sections 54 will be lowered until their tips 64 rest on the truck bed. The lowering of the frame 26 relative to the deck sections will continue and the tube 38 will no longer support the deck sections 54 which will be entirely supported by the truck bed and the stationary support 22. The spring 120 then closes the switch 114, thereby energizing a circuit through the solenoid 118 even though the switch 122 be opened. The valve 80 remains open to provide an open fluid path between the jack 38 and the tank 32.

The downward lost motion pivotal movement of the frame 26 relative to the deck sections 54 is limited by a stop 126 carried on a stem 128 welded to a deck section 54 preferably near the transverse center of the deck and passing through an apertured lug 130 welded to the tubular member 32.

During the loading or unloading of the truck, the truck bed probably will move up and down, and this movement is permitted because the deck sections 54 are supported only by the truck bed and the fixed support or stationary dock. Furthermore, should one side of the truck move lower or higher than the other side, the sections will be individually supported on the truck bed at various heights, as shown in Fig. 5 in a somewhat exaggerated manner.

Should, for some reason, the truck bed be depressed beyond the lower pivotal limit of the loading dock ramp 10, or should the truck bed suddenly be driven out from under the loading dock, the amount of drop or fall of the ramp will be limited to the amount of lost motion permitted by the stop 126 because the leaves, when unsupported at their outer ends by the truck bed, will drop onto the torque tube 32, and the center deck sections 54 will open the switch 114, breaking the circuit to the solenoid 118 which then permits the valve 80 to close, terminating the free flow of hydraulic fluid between the jack 38 and the tank 32.

It should be noted that the frame 26 is relatively light. This is made possible by the torque tube 32 adjacent the outer edge of the frame. This importance of the tube 32 is realized when the loading dock ramp 10 becomes a part of the stationary dock and loads are moved thereacross in the transverse direction. The twisting of the frame is inhibited by the torque tube 32 which is supported at its center by the jack 38.

It will be seen from the foregoing description that the objectives which were claimed for this invention in the opening paragraphs have been fully attained.

While a preferred embodiment of the loading dock ramp constituting this invention has been shown and described, it will be apparent that numerous modifications and variations thereof may be made without departing from the underlying principles of the invention. It is, therefore, desired by the following claims to include within the scope of the invention all such variations and modifications by which substantially the results of this invention may be obtained through the use of the same or equivalent means.

What is claimed as new and desired to be secured by United States Letters Patent is:

1. In an adjustable loading dock ramp, a fixed support, a deck comprising a plurality of deck leaves, means pivotally mounting one end of each of said deck leaves to said support, the free ends of said deck leaves being adapted to be supported on a truck bed or the like, a transverse member underlying said deck leaves at a point intermediate their free ends and said fixed support and adapted to support said deck leaves when the latter are not supported by a truck bed or the like, said deck leaves having pivotal lost motion movement relative to said transverse member, hanger means interconnecting one of said deck leaves and said transverse member for limiting the extent of said lost motion movement, means vertically adjustably supporting said transverse member, and control means rendering said last named means ineffective as a support when said deck leaves are spaced above said transverse member and the latter is supported from said one deck leaf by said hanger means, said control means being actuated by one of said deck leaves to activate said vertically adjustable means as a support when said last mentioned deck leaf rests on said transverse member, whereby free fall of said deck leaves is limited to the lost motion distance should said free ends of said deck leaves be suddenly left unsupported.

2. In an adjustable loading dock ramp, a fixed support, a deck comprising a plurality of deck leaves, means pivotally mounting one end of each of said deck leaves to said support, the free ends of said deck leaves being adapted to be supported on a truck bed or the like, a generally rectangular frame underlying said deck, means pivoting said frame to said fixed support, said frame having a tubular torsion resisting, hydraulic fluid tank providing member at its outer edge which is adapted to support said deck leaves at a point intermediate their ends when said deck leaves are not supported by a truck bed or the like, said deck leaves having pivotal lost motion movement relative to said frame and said tubular tank member, a hanger interconnecting one of said deck leaves and said tubular tank member for limiting the extent of lost motion movement, a hydraulic jack having an anchored end and a movable end connected to said tubular tank member for vertically adjustably supporting said frame and said free ends of said deck leaves, a hydraulic pump mounted on said tubular tank member and having its inlet connected thereto and its outlet connected to said jack, a solenoid operated valve mounted on said tubular tank member and connected between said tubular tank member and said hydraulic jack in parallel with said pump, an electric control circuit for said solenoid operated valve including switch means, and a switch actuator for said switch means mounted on said tubular tank member and positioned to be contacted by one of said deck leaves when said last mentioned deck leaf is supported by said tubular tank member to open said control circuit thereby to close said solenoid operated valve, whereby movement of said last mentioned deck leaf away from said tubular tank member closes said electric control circuit to open said valve thereby to permit said limited lost motion movement.

References Cited in the file of this patent

UNITED STATES PATENTS

| | | |
|---|---|---|
| 1,007,190 | Faust | Oct. 31, 1911 |
| 2,639,450 | Ramer | May 26, 1953 |
| 2,644,971 | Rowe | July 14, 1953 |
| 2,689,965 | Fenton | Sept. 28, 1954 |
| 2,731,892 | Simmonds | Jan. 24, 1956 |

OTHER REFERENCES

Freight Handling, pages 27 and 28, published by The Anglo American Council on Productivity (July 1951).

Beacon Ramp Docks, by Beacon Machinery Inc.

Rotary Leva-Dock Brochure RE–402, by Rotary Lift Co., 1054 Kansas, Memphis 2, Tenn.